United States Patent
Shibasaki

(10) Patent No.: US 11,693,206 B2
(45) Date of Patent: Jul. 4, 2023

(54) LENS APPARATUS AND IMAGE PICKUP APPARATUS

(71) Applicant: CANON KABUSHIKI KAISHA, Tokyo (JP)

(72) Inventor: Go Shibasaki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 433 days.

(21) Appl. No.: 17/079,303

(22) Filed: Oct. 23, 2020

(65) Prior Publication Data

US 2021/0132324 A1 May 6, 2021

(30) Foreign Application Priority Data

Oct. 31, 2019 (JP) .................. 2019-199108

(51) Int. Cl.
  *G02B 7/02* (2021.01)
  *H04N 5/225* (2006.01)
  *G02B 7/04* (2021.01)
  *H04N 23/55* (2023.01)

(52) U.S. Cl.
  CPC ............... *G02B 7/026* (2013.01); *G02B 7/04* (2013.01); *H04N 23/55* (2023.01)

(58) Field of Classification Search
  CPC .......... G02B 7/026; G02B 7/021; G02B 7/10; G02B 7/04; G02B 7/023; G02B 7/102; G02B 7/08; G02B 7/022; H04N 23/53; H04N 23/54; H04N 23/55
  See application file for complete search history.

(56) References Cited

U.S. PATENT DOCUMENTS

2009/0207503 A1* 8/2009 Takebayashi .......... G02B 7/102
                                                              396/530

FOREIGN PATENT DOCUMENTS

| JP | H06-087913 U | | 12/1994 |
| JP | 10020176 A | * | 1/1998 |
| JP | 2009-080437 A | | 4/2009 |
| JP | 2019003012 A | | 1/2019 |
| JP | 2019128471 A | * | 8/2019 |

* cited by examiner

*Primary Examiner* — Ephrem Z Mebrahtu
(74) *Attorney, Agent, or Firm* — Canon U.S.A., Inc. IP Division

(57) ABSTRACT

A lens apparatus includes a first barrel member including a first helicoid screw on an inner surface included therein, a second barrel member including a second helicoid screw, screwed with the first helicoid screw, on an outer surface included therein, the second barrel member being movable along a direction of an axis of the first barrel member, an urging member configured to urge the second helicoid screw against the first helicoid screw in a direction of a diameter of the first barrel member, and a third barrel member including an outer surface which has a diameter smaller than a diameter of the second helicoid screw. The urging member is held by the second barrel member inside the second barrel member, and is in contact with the outer surface of the third barrel member.

20 Claims, 5 Drawing Sheets

LENS APPARATUS AND IMAGE PICKUP APPARATUS

BACKGROUND OF THE DISCLOSURE

Field of the Disclosure

The aspect of the embodiments relates to a lens apparatus and an image pickup apparatus.

Description of the Related Art

A lens apparatus that moves one of a pair of barrel members, coupled through a helicoid mechanism and having an optical element mounted on the barrel member along an optical axis, by rotationally operating an operation ring (operation member) for focusing, magnification, etc. has been known. The helicoid mechanism is widely used as a driving mechanism for lenses of the lens apparatus. To smoothly operate the helicoid mechanism, a minute backlash (gap) is necessary in an axis direction and a radial direction between the pair of members coupled through the helicoid mechanism. When attitudes of the lenses are changed due to the minute backlash, however, optical performance may be changed. Therefore, to reduce such change, a structure in which the backlash in the radial direction between the pair of members is reduced by urging force of an elastic member has been proposed.

Japanese Patent Application Laid-Open No. 2009-80437 discusses a structure in which a metal ball is pressed against a thread of a male helicoid by an elastic member. In addition, Japanese Patent Application Laid-Open No. 2019-3012 discusses a lens apparatus in which a male helicoid includes a pressed portion, a female helicoid includes a pressing portion, and the pressed portion is pressed by the pressing portion. Further, Japanese Utility Model Application Laid-Open No. 6-87913 discusses a lens barrel in which a linear guide mechanism that limits rotation of a male helicoid moved along an optical axis is provided inside the male helicoid, and the linear guide mechanism urges the male helicoid from the inside in a radial direction.

The structure in which a screw portion of the helicoid is directly urged as discussed in Japanese Patent Application Laid-Open No. 2009-80437 is disadvantageous in durability because local abrasion of the screw portion of the helicoid and a phenomenon in which lubricant such as grease is scraped out at an urged position may occur. Further, in a case where the structure discussed in Japanese Patent Application Laid-Open No. 2019-3012 is applied to a male helicoid holding an optical element, an urging position changes relative to a centroid position of the male helicoid along with movement of the male helicoid along an optical axis. Therefore, attitude change such as inclination of the optical element easily occurs due to change in a balanced state of forces acting on the male helicoid. Further, in the lens barrel discussed in Japanese Utility Model Application Laid-Open No. 6-87913, attitude change such as inclination of the optical element easily occurs due to change in a balanced state of forces similarly to the structure discussed in Japanese Patent Application Laid-Open No. 2019-3012. In addition, the structure brings the urging member having a width into contact with the male helicoid. As a result, the urged state may become unstable by partial contact of an edge part of the urging member.

SUMMARY OF THE DISCLOSURE

According to an aspect of embodiments, a lens apparatus includes a first barrel member including a first helicoid screw on an inner surface included therein, a second barrel member including a second helicoid screw, screwed with the first helicoid screw, on an outer surface included therein, the second barrel member being movable along a direction of an axis of the first barrel member, an urging member configured to urge the second helicoid screw against the first helicoid screw in a direction of a diameter of the first barrel member, and a third barrel member including an outer surface which has a diameter smaller than a diameter of the second helicoid screw. The urging member is held by the second barrel member inside the second barrel member, and is in contact with the outer surface of the third barrel member.

Further features of the disclosure will become apparent from the following description of exemplary embodiments with reference to the attached drawings.

DESCRIPTION OF THE EMBODIMENTS

Figure 1:
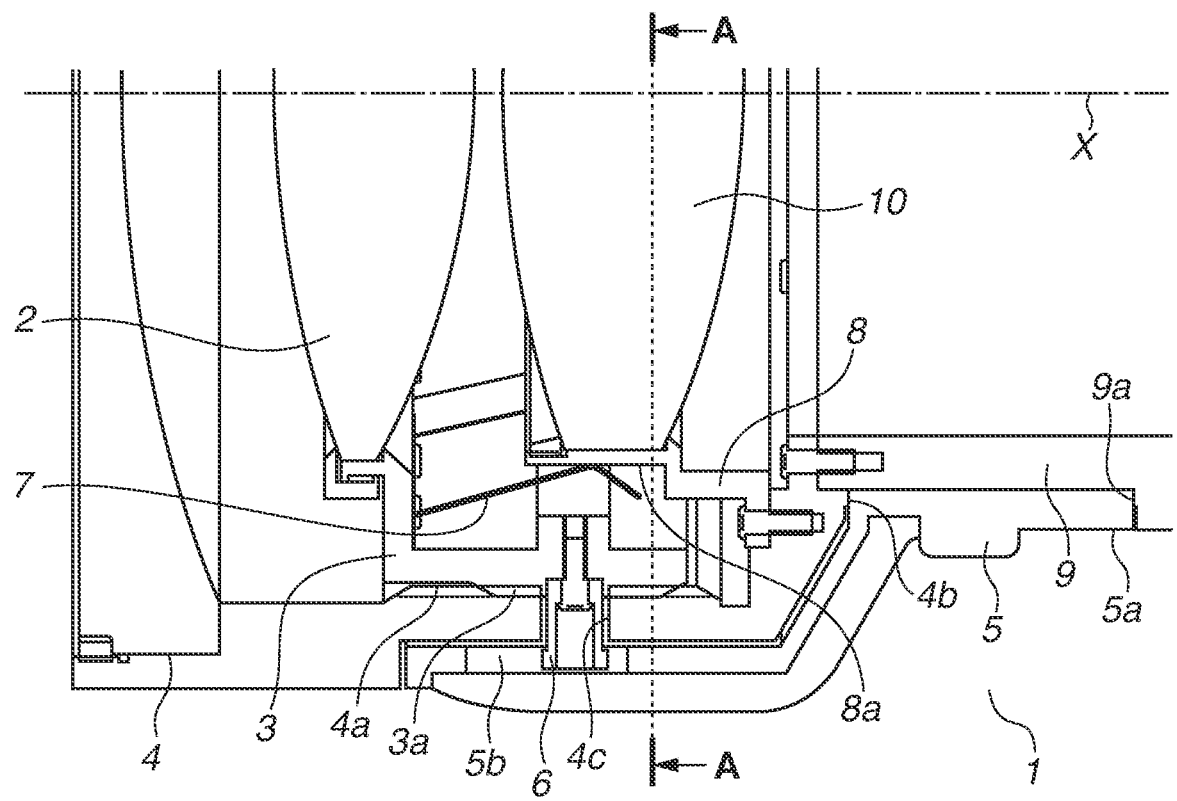
FIG. 1 is a diagram illustrating a configuration example of a lens apparatus according to a first exemplary embodiment.

Some exemplary embodiments of the disclosure will be described below with reference to accompanying drawings. The same members are basically denoted by the same reference numerals (unless otherwise noted) in all of the drawings for describing the exemplary embodiments, and repetitive descriptions of the members and the like are omitted.

Figure 2A:
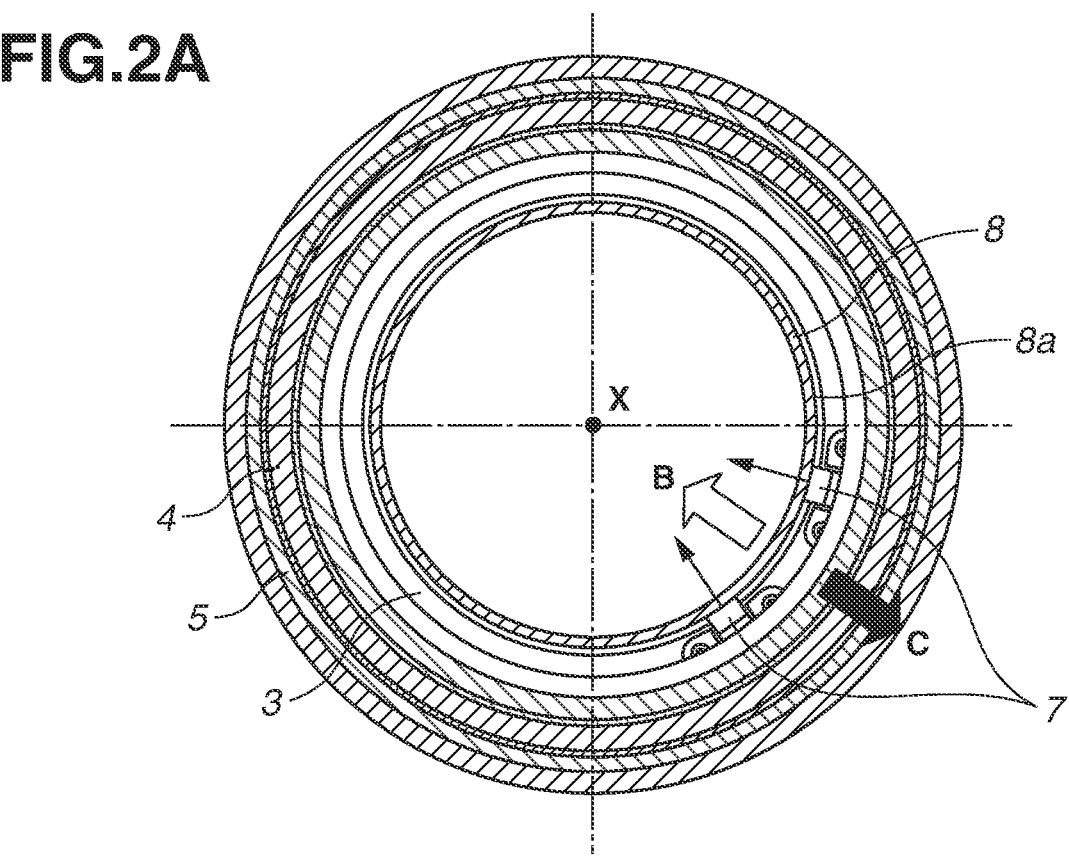
FIGS. 2A and 2B are diagrams each illustrating a vertical cross-section of the configuration example of the lens apparatus taken along line A-A illustrated in FIG. 1.
Figure 2B:
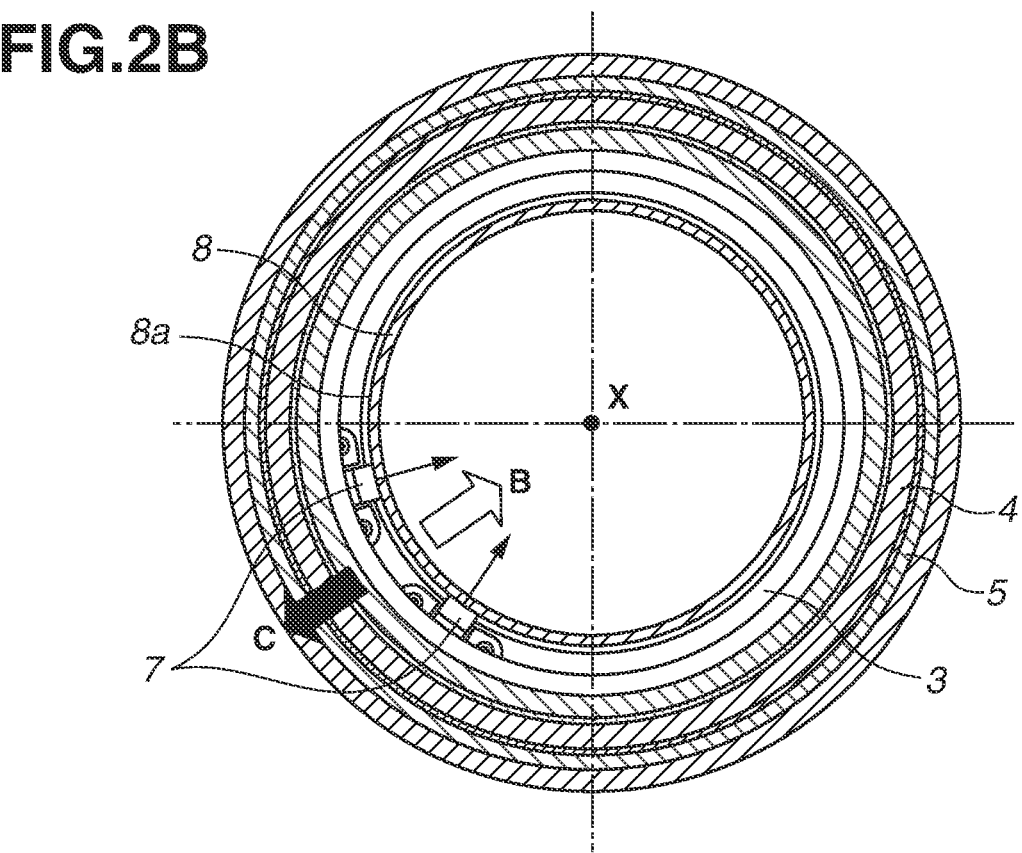

FIG. 1 is a diagram illustrating a configuration example of a lens apparatus according to a first exemplary embodiment. In FIG. 1, a left side is an object side, and a right side is an image side. FIGS. 2A and 2B are diagrams each illustrating a vertical cross-section of the configuration example of the lens apparatus taken along line A-A illustrated in FIG. 1. A fixed barrel 9 is fixed at a coupling portion with an image pickup apparatus (not illustrated) to which the lens apparatus 1 is mounted. The lens apparatus 1 includes an optical element 2 movable for focusing, and moves the optical element 2 along a direction of an optical axis X (direction of axis of fixed barrel 9) corresponding to a right-left direction in FIG. 1, thereby continuously changing a focal position (object distance) of the lens apparatus 1. The optical element 2 is held by a movable moving barrel 3 (second barrel member), and a helicoid screw 3a is provided on an outer surface of the moving barrel 3. A fixed barrel 4 (first fixed barrel or first barrel member) coupled and fixed to the fixed barrel 9 by a screw includes a helicoid screw 4a at a part of an inner surface. The helicoid screw 3a of the moving barrel 3 and the helicoid screw 4a of the fixed barrel 4 are screwed together. A portion where the helicoid screw 3a and the helicoid screw 4a are screwed together is provided with a minute backlash in a diameter direction and an axis direction of each of the barrels, which allows for smooth sliding. A focus operation ring 5 serving as an operation member has an inner surface that engages with an outer surface of the fixed barrel 9, and a focus index representing the object distance is engraved on an outer surface 5a of the focus operation ring 5. A portion where the fixed barrel 9 and the focus operation ring 5 engage with each other is configured such that the focus operation ring 5 is smoothly rotatable. The focus operation ring 5 is regulated in movement in the optical axis direction by being sandwiched between a sliding surface 4b of the fixed barrel 4 and a sliding surface 9a of the fixed barrel 9. A coupling pin 6 is fixed on an outer peripheral portion of the moving barrel 3. The coupling pin 6 engages with a guide groove 5b provided on the focus operation ring 5 through a through hole 4c provided in the fixed barrel 4. The guide groove 5b is parallel to the optical axis X. According to the above-described configuration, when the focus operation ring 5 is rotated around the optical axis X, the moving barrel 3 is rotated via the coupling pin 6, and the moving barrel 3 is moved along the optical axis X by following the lead of the helicoid screw.

Figure 3:
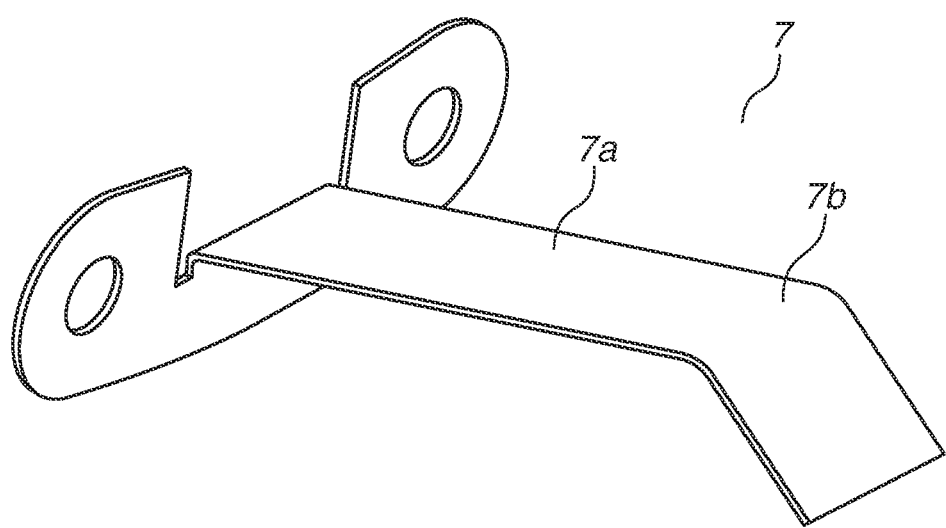
FIG. 3 is a diagram illustrating a configuration example of a plate spring.

Inside the helicoid screw 3a of the moving barrel 3, plate springs 7 (plate-shaped elastic members) are fixed to the moving barrel 3 by screws. FIG. 3 is a diagram illustrating a configuration example of each of the plate springs. In FIG. 3, each of the plate springs 7 includes a strip-shaped arm portion 7a extending along the optical axis, and an arc-shaped bent portion 7b (curved surface) is provided on (front end of) the arm portion 7a. On the other hand, an optical element 10 is held by a fixed barrel 8 (second fixed barrel or third barrel member) on an image side of the optical element 2, and the fixed barrel 8 is coupled and fixed to the fixed barrel 9. The fixed barrel 8 includes a smoothly-finished sliding surface 8a (cylindrical surface-shaped curved surface) at a position overlapping with the helicoid screw 3a of the moving barrel 3 in the optical axis X direction, and the bent portions 7b of the plate springs 7 are in contact with the sliding surface 8a. Urging force in a direction toward the optical axis X acts on a portion where each of the bent portions 7b and the sliding surface 8a are in contact with each other, by elastic force of the corresponding plate spring 7. Each of the arc-shaped bent portions 7b and the cylindrical surface-shaped sliding surface 8a come into point contact with each other (contact through point-shaped portions) because of contact between convex surfaces. Further, along with the rotation operation of the focus operation ring 5, the contact portions on the sliding surface 8a are each changed in an angle around the optical axis X and are each changed in position in the optical axis direction. To realize smooth sliding at the contact portions, lubricant is applied on the sliding surface 8a.

In the present exemplary embodiment, the plate springs 7 are disposed at two different positions (commonly, at plurality of positions) in a circumferential direction on the moving barrel 3. As illustrated by arrows in FIGS. 2A and 2B, the generated urging force is directed toward the optical axis X in all of the plate springs 7. FIGS. 2A and 2B each illustrate an end state generated by the rotation operation of the focus operation ring 5, and an operation range of the focus operation ring 5 is from the state illustrated in FIG. 2A to the state illustrated in FIG. 2B that is established by rotating the focus operation ring 5 in a clockwise direction. In other words, the entire operation range for focusing, the plate springs 7 are constantly located below the optical axis X that is horizontally arranged (elevation angle of 0 degrees) with the lens apparatus being not rolled about the axis.

Effects achieved by the lens apparatus 1 according to the present exemplary embodiment are described below. As illustrated in FIGS. 2A and 2B, on the contact portion between each of the plate springs 7 fixed to the moving barrel 3 and the sliding surface 8a of the fixed barrel 8, the urging force toward the optical axis X acts from the corresponding plate spring 7. Since the fixed barrel 8 does not move, force that is opposite in direction and equivalent in magnitude to the urging force acts on the moving barrel 3 as reaction. In FIG. 2A, the urging forces by the two plate springs 7 become force in a B direction in FIG. 2A as resultant force of the forces in the two directions. Accordingly, the moving barrel 3 receives force in a C direction in FIG. 2A as reaction force. As a result, the moving barrel 3 that is screwed together with the fixed barrel 4 through the helicoid screws 3a and 4a with the minute backlash in the radial direction is urged in the C direction in FIG. 2A by the above-described reaction force, and the backlash is reduced. The reduction of the backlash reduces attitude change of the optical element 2 held by the moving barrel 3. This makes it possible to reduce change in optical performance.

In the present exemplary embodiment, each of the plate springs 7 as the urging members contacts a portion other than the helicoid screws 3a and 4a. Therefore, local abrasion of the helicoid screws 3a and 4b and reduction of the lubricant such as grease do not occur. This is advantageous in terms of durability. Further, since the plate springs 7 are fixed to the moving barrel 3, the urging positions to a centroid position of a moving unit including the moving barrel 3 and the optical element 2 are not changed. Therefore, even when the moving barrel 3 is moved in the optical axis direction by the focusing operation, a balanced state of forces acting on the moving unit does not change. This is advantageous in terms of stability of the attitude of the optical element 2, namely, in stability of optical performance. Furthermore, since each of the plate springs 7 has a structure coming into point contact with the sliding surface 8a near a center of the strip-shaped arm portion 7a in a width (short-side) direction, an edge part does not partially contact the sliding surface 8a, and is hardly influenced by variation in a component assembled state. The urging structure according to the present exemplary embodiment is hardly influenced by difference in reciprocating direction in rotation of the moving barrel 3 around the optical axis and movement along the optical axis. This is advantageous in terms of stability of the urged state.

In the present exemplary embodiment, the position of the contact portion between each of the plate springs 7 and the sliding surface 8a overlaps a range where the helicoid screw 3a of the moving barrel 3 is positioned in the optical axis direction (in one embodiment, at position near center of range). This is advantageous in terms of small inclination of the moving barrel 3 as compared with a case where the contact portion is located at a position excessively separated from the helicoid screw 3a. In a case where the backlash is reduced in the radial direction at an attitude where inclination of the moving barrel 3 is excessively large, abrasion is remarkable near an end on either one of the object side and the image side of the helicoid screw 3a. Thus, according to the present exemplary embodiment, it is advantageous in terms of durability.

Further, in the present exemplary embodiment, the plate springs 7 are disposed at the two positions to apply the urging force in two different directions. This enhances directivity of backlash elimination (backlash reduction). Further, over the entire focusing operation range, the plate springs 7 are constantly located below the optical axis X horizontally arranged (elevation angle of 0 degrees) with the lens apparatus being not rolled about the axis. As a result, the urging force acting on the moving barrel 3 is constantly directed downward with respect to the horizontal direction without contradicting the gravity. In other words, the urging by the plate springs 7 acts to overlap urging by the gravity. This is advantageous in terms of stability of the attitude of the moving barrel 3.

In the present exemplary embodiment, the member including the helicoid screw on the inner surface is the fixed barrel, and the member including the helicoid screw on the outer surface is moving barrel; however, the configuration is not limited thereto. For example, the former may be a rotationally operable barrel member, and the latter may be a moving barrel regulated in rotation around the optical axis.

As described above, according to the present exemplary embodiment, it is possible to provide the lens apparatus advantageous in durability, simple structure, and stability of optical performance.

Figure 4:
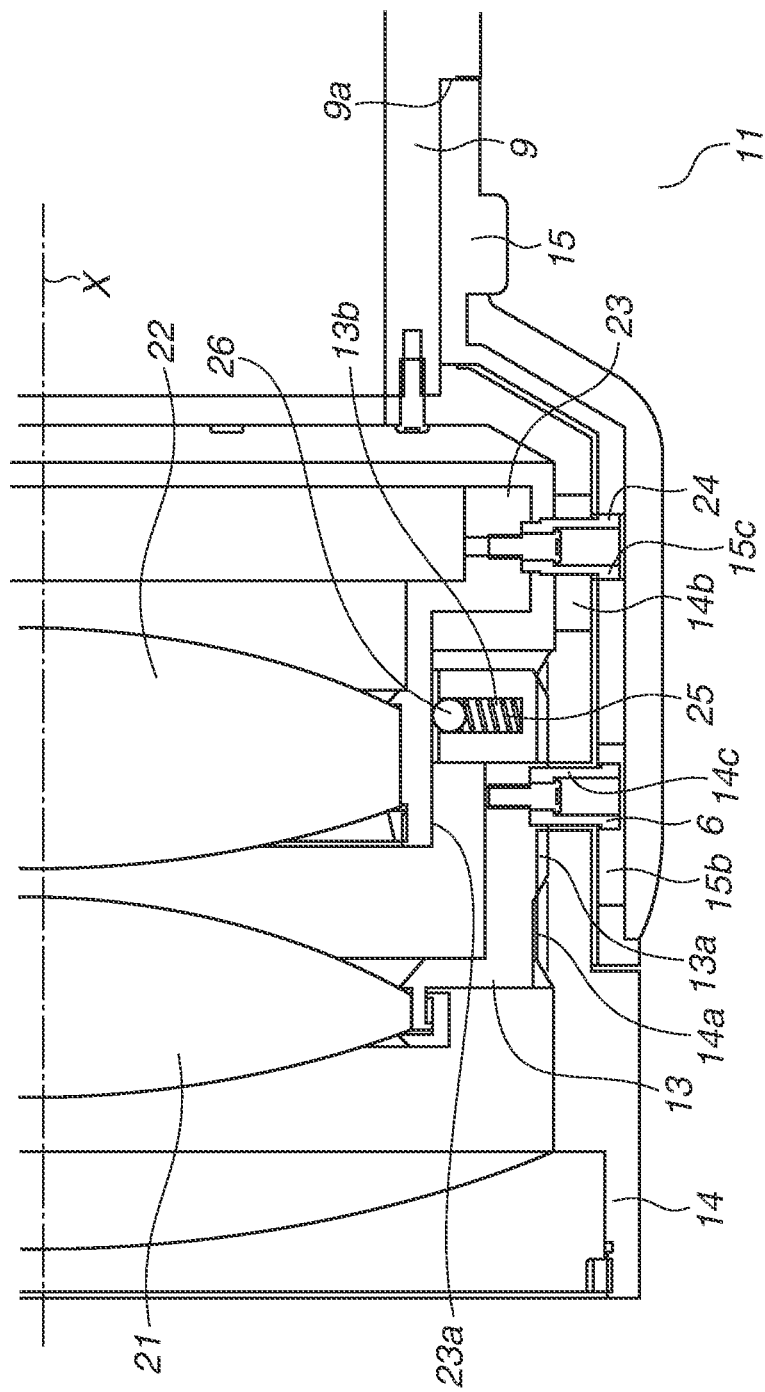
FIG. 4 is a diagram illustrating a configuration example of a lens apparatus according to a second exemplary embodiment.

FIG. 4 is a diagram illustrating a configuration example of a lens apparatus according to a second exemplary embodiment. In the following, a configuration different from the configuration according to the first exemplary embodiment will be described. A lens apparatus 11 according to the present exemplary embodiment includes an optical element 21 and an optical element 22 for focusing, and a focal position of the lens apparatus 11 is continuously changed by moving the optical element 21 and the optical element 22 in the optical axis X direction while maintaining a predetermined distance therebetween.

The optical element 21 is held by a moving barrel 13, and a helicoid screw 13*a* is provided on an outer surface of the moving barrel 13. A fixed barrel 14 coupled to and fixed to the fixed barrel 9 by a screw has a helicoid screw 14*a* on a part of an inner surface. The helicoid screw 13*a* of the moving barrel 13 and the helicoid screw 14*a* of the fixed barrel 14 are screwed together. The coupling pin 6 is fixed on an outer peripheral portion of the moving barrel 13. The coupling pin 6 engages with a guide groove 15*b* provided on a focus operation ring 15 via a through hole 14*c* provided in the fixed barrel 14. The guide groove 15*b* is parallel to the optical axis X.

The optical element 22 is held by a moving barrel 23 (third barrel member). Three cam followers 24 are fixed to the outer peripheral portion of the moving barrel 23 at equal intervals in a circumferential direction. The fixed barrel 14 includes three linear guide grooves 14*b*, and the focus operation ring 15 includes three cam grooves 15*c*. The cam followers 24 slidably engage with the linear guide grooves 14*b* and the cam grooves 15*c*.

According to the above-described configuration, when the focus operation ring 15 is rotated around the optical axis X, the moving barrel 13 is rotated via the coupling pin 6, and the moving barrel 13 is moved along the optical axis X by following the lead of the helicoid screw. Further, the moving barrel 23 is moved along the optical axis X by the engagement between the cam followers 24 and the cam grooves 15*c* while being regulated in rotation around the optical axis X by the engagement between the cam followers 24 and the linear guide grooves 14*b*.

The moving barrel 13 includes a not-through recessed portion 13*b* inside the helicoid screw 13*a*. A spherical member 26 and a coil spring 25 (elastic member or urging portion) urging the spherical member 26 are disposed in the recessed portion 13*b*, and the spherical member 26 is in contact with a sliding surface 23*a* on an outer surface of the moving barrel 23. The sliding surface 23*a* overlaps the helicoid screw 13*a* in the optical axis X direction, and is smoothly finished. By elastic force of the coil spring 25, urging force in a direction toward the optical axis X acts on a contact portion between the spherical member 26 and the sliding surface 23*a*. Lubricant is applied to the sliding surface 23*a* for smooth sliding at the contact portion. Note that, in the present exemplary embodiment, an urging structure (urging member) to the moving barrel 13, including the spherical member 26 and the coil spring 25 may be disposed at two different positions (commonly, at plurality of positions) in the circumferential direction on the moving barrel 13.

Effects achieved by the lens apparatus 11 according to the present exemplary embodiment are described below. As with the first exemplary embodiment, reaction force that is opposite in direction and is equivalent in magnitude to the urging force by the coil spring 25 acts on the moving barrel 13. As a result, the moving barrel 13 including the helicoid screw screwed together with the helicoid screw of the fixed barrel 14 with the minute backlash in the radial direction, is removed of its backlash by the reaction force. The attitude change of the optical element 21 held by the moving barrel 13 is reduced by the backlash removal. This is advantageous in stability of optical performance.

Further, in the present exemplary embodiment, the spherical member 26 urged by the coil spring 25 contacts a portion other than the helicoid screws 13*a* and 14*a*. Therefore, local abrasion of the helicoid screws 13*a* and 14*b* and reduction of the lubricant such as grease hardly occur. This is advantageous in terms of durability. Further, since the coil spring 25 and the spherical member 26 are disposed in the moving barrel 13, a distance from a centroid position of a moving unit including the moving barrel 13 and the optical element 21 to the urging position in the optical axis X direction is constant. Accordingly, a balanced state of forces acting on the moving unit does not change along with the movement of the moving unit along the optical axis by focusing operation. This is advantageous in terms of stability of the attitude of the optical element 21. Further, the spherical member 26 (contact portion thereof is spherical curved surface) and the sliding surface 23*a* (contact portion thereof is cylindrical curved surface) come into point contact with each other (at point-shaped contact portion). This is hardly influenced by variation in a component assembled state, and is advantageous in stability of the attitude of the moving barrel 13 with respect to rotation around the optical axis X and movement along the optical axis X. This is thus advantageous in terms of stability of optical performance.

As described above, according to the present exemplary embodiment, it is possible to provide the lens apparatus advantageous in durability, simple structure, and stability of optical performance.

Exemplary Embodiment Relating to Image Pickup Apparatus

Figure 5:
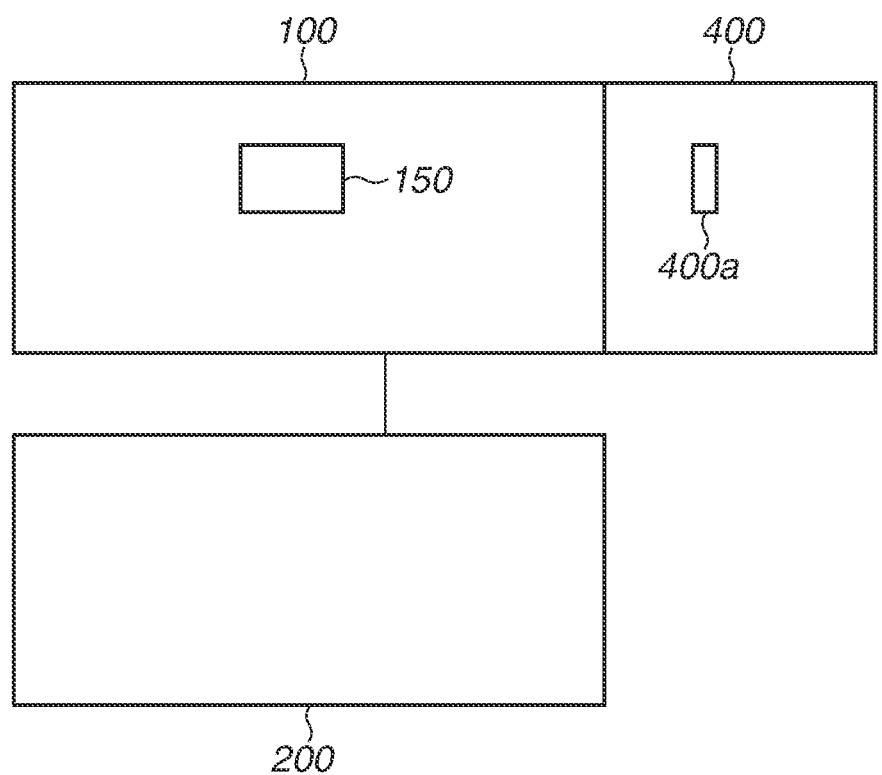
FIG. 5 is a diagram illustrating a configuration example of an image pickup apparatus.

FIG. 5 is a diagram illustrating a configuration example of an image pickup apparatus. The image pickup apparatus includes a lens apparatus 100 (including lens apparatus 1 or 11 illustrated above), and an operation device 200 that generates a signal to operate an optical member 150 of the lens apparatus 100 and transmits the signal to the lens apparatus 100. The image pickup apparatus further includes a camera device (image pickup unit) 400 including an image pickup element 400*a* that receives light of an image formed by the lens apparatus 100. According to the present exemplary embodiment, it is possible to provide the image pickup apparatus advantageous in, for example, durability, simple structure, and stability of optical performance. An optical device can be formed by the lens apparatus 100 or the optical member 150 of the lens apparatus 100, and the operation device 200.

Although the exemplary embodiments of the disclosure have been described above, the disclosure is not limited to these exemplary embodiments, and various modifications and alternations can be made within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-199108, filed Oct. 31, 2019, which is hereby incorporated by reference herein in its entirety.

What is claimed is:

1. A lens apparatus comprising:
a first barrel member including a first helicoid screw on an inner surface included therein;
a second barrel member including a second helicoid screw to be screwed together with the first helicoid screw on an outer surface, the second barrel member being movable along a direction of an axis of the first barrel member;
an urging member configured to urge the second helicoid screw against the first helicoid screw in a direction of a diameter of the first barrel member; and
a third barrel member including an outer surface which has a diameter smaller than a diameter of the second helicoid screw,
wherein the urging member is held by the second barrel member inside the second barrel member, and is in contact with the outer surface of the third barrel member.

2. The lens apparatus according to claim 1, wherein the urging member includes a curved surface being in contact with the outer surface of the third barrel member.

3. The lens apparatus according to claim 1, wherein a position where the urging member is in contact with the outer surface of the third barrel member overlaps a region where the second helicoid screw is located in the direction of the axis.

4. The lens apparatus according to claim 1, wherein the urging member includes a leaf spring.

5. The lens apparatus according to claim 1, wherein the urging member includes a spherical member in contact with the outer surface of the third barrel member.

6. The lens apparatus according to claim 1, wherein the urging member is disposed at each of a plurality of different positions in a circumferential direction of the second barrel member.

7. The lens apparatus according to claim 1, wherein the urging member is located below the axis arranged horizontally with the lens apparatus being not rolled about the axis, in a range where the second barrel member is movable along the direction of the axis.

8. The lens apparatus according to claim 1, wherein the second barrel member is configured to be rotated about the axis.

9. The lens apparatus according to claim 8, further comprising an operation ring coupled to the second barrel member via a through hole formed in the first barrel member.

10. The lens apparatus according to claim 1, wherein the first barrel member is configured to be operable to be rotated about the axis.

11. An image pickup apparatus, comprising:
a lens apparatus; and
an image pickup element configured to pick up an image formed by the lens apparatus, wherein the lens apparatus comprises:
a first barrel member including a first helicoid screw on an inner surface included therein;
a second barrel member including a second helicoid screw to be screwed together with the first helicoid screw on an outer surface, the second barrel member being movable along a direction of an axis of the first barrel member;
an urging member configured to urge the second helicoid screw against the first helicoid screw in a direction of a diameter of the first barrel member; and
a third barrel member including an outer surface which has a diameter smaller than a diameter of the second helicoid screw,
wherein the urging member is held by the second barrel member inside the second barrel member, and is in contact with the outer surface of the third barrel member.

12. The image pickup apparatus according to claim 11, wherein the urging member includes a curved surface being in contact with the outer surface of the third barrel member.

13. The image pickup apparatus according to claim 11, wherein a position where the urging member is in contact with the outer surface of the third barrel member overlaps a region where the second helicoid screw is located in the direction of the axis.

14. The image pickup apparatus according to claim 11, wherein the urging member includes a leaf spring.

15. The image pickup apparatus according to claim 11, wherein the urging member includes a spherical member in contact with the outer surface of the third barrel member.

16. The image pickup apparatus according to claim 11, wherein the urging member is disposed at each of a plurality of different positions in a circumferential direction of the second barrel member.

17. The image pickup apparatus according to claim 11, wherein the urging member is located below the axis arranged horizontally with the lens apparatus being not rolled about the axis, in a range where the second barrel member is movable along the direction of the axis.

18. The image pickup apparatus according to claim 11, wherein the second barrel member is configured to be rotated about the axis.

19. The image pickup apparatus according to claim 18, further comprising an operation ring coupled to the second barrel member via a through hole formed in the first barrel member.

20. The image pickup apparatus according to claim 11, wherein the first barrel member is configured to be operable to be rotated about the axis.

* * * * *